2 Sheets—Sheet 1.

D. K. & J. K. HARRIS.

Mowing Machine.

No. 1,487.

Reissued May 26, 1863.

N. PETERS, Photo-Lithographer, Washington, D. C.

2 Sheets—Sheet 2.

D. K. & J. K. HARRIS.

Mowing Machine.

No. 1,487.

Reissued May 26, 1863.

N. PETERS, Photo-Lithographer, Washington, D. C.

UNITED STATES PATENT OFFICE.

WM. N. WHITELEY, JEROME FASSLER, AND OLIVER S. KELLEY, OF SPRINGFIELD, OHIO, ASSIGNEES OF D. K. AND JOHN K. HARRIS.

IMPROVEMENT IN MOWING-MACHINES.

Specification forming part of Letters Patent No. 6,846, dated November 6, 1849; Reissue No. 1,487, dated May 26, 1863.

*To all whom it may concern:*

Be it known that DANIEL K. HARRIS and JOHN K. HARRIS, of Allensville, in the county of Switzerland and State of Indiana, did invent a new and useful Improvement in Mowers or Machines for Cutting Grass, &c., by Horse-Power, of which the following is a full, clear, and exact description of the construction and operatoin of the same, reference being had to the annexed drawings and letters of reference marked thereon, which form part of this specification, in which—

Figure 2:
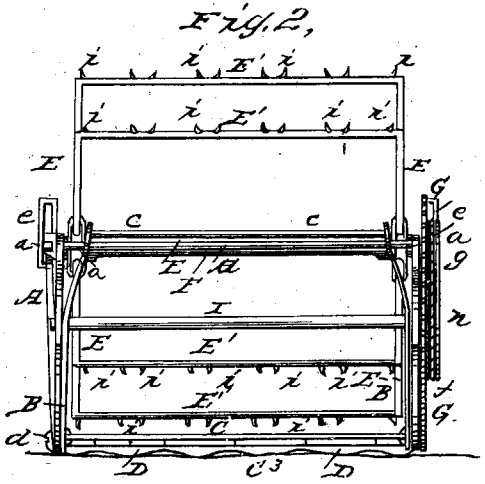
Figure 4:
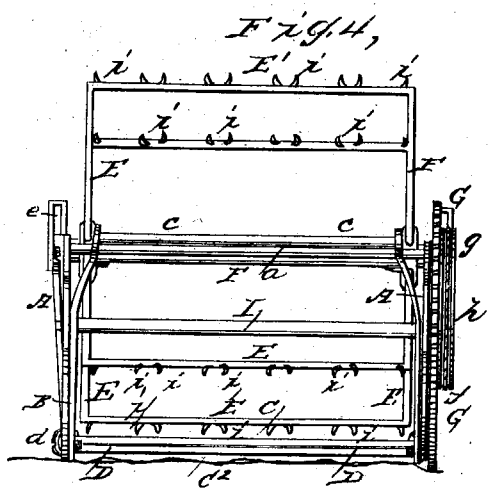
Figure 1:
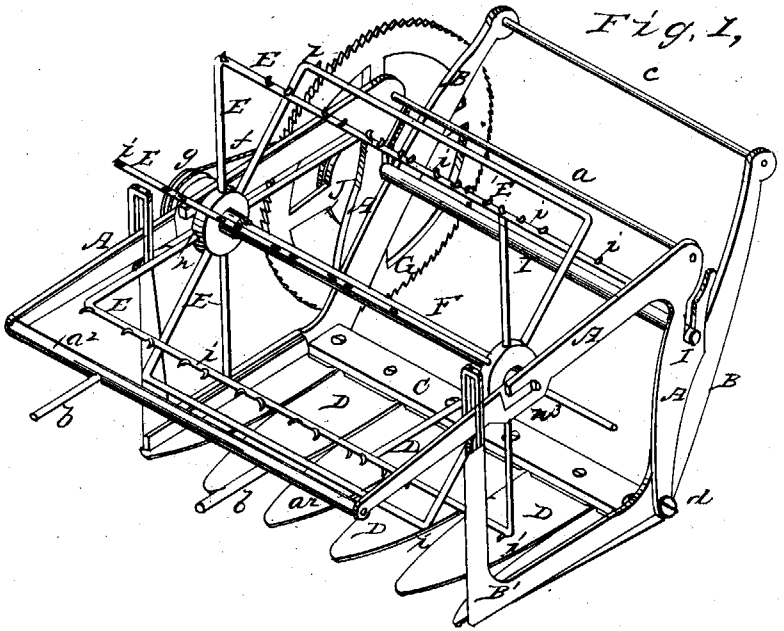
Figure 3:
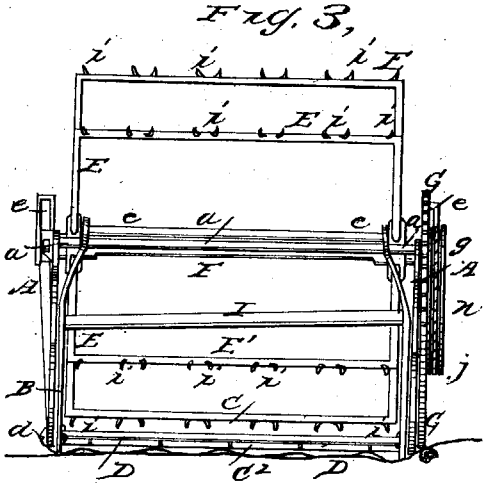
Figure 5:
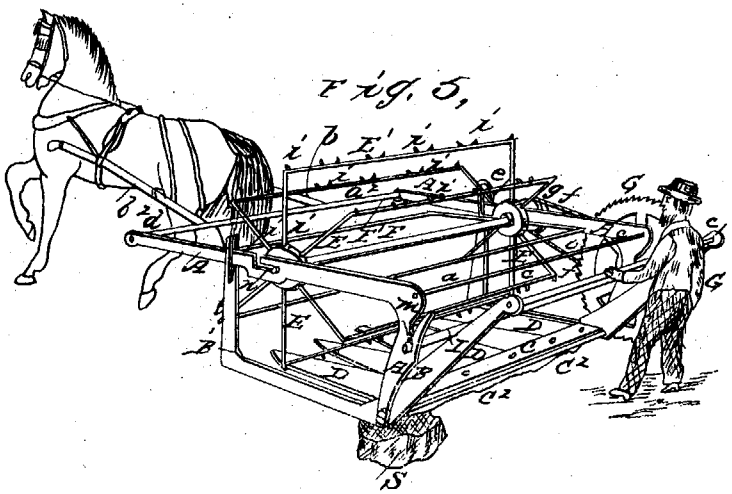
Figure 8:
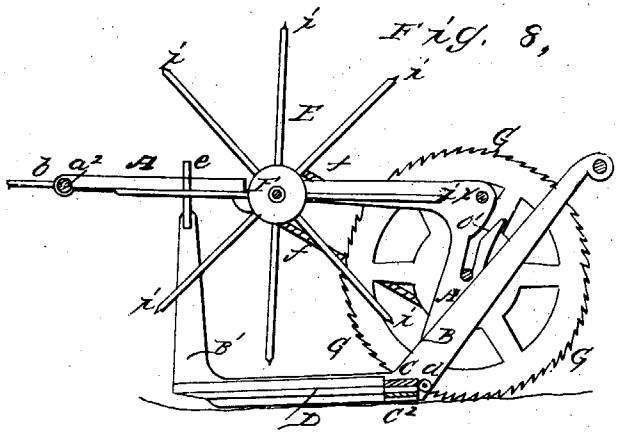
Figure 6:
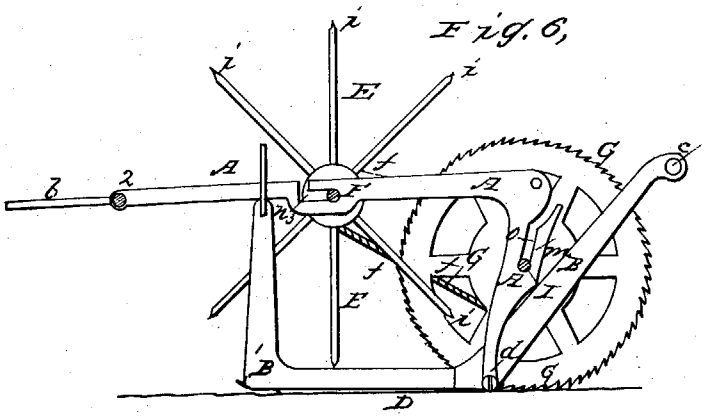
Figure 7:
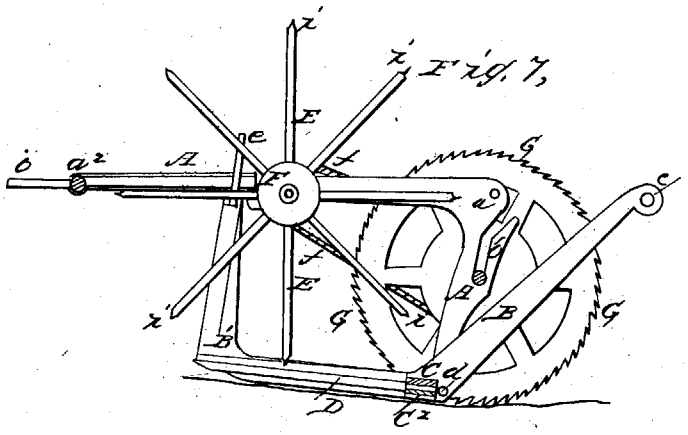

Figure 1 shows an isometrical perspective view of the machine; Fig. 2, a rear elevation of the machine; Fig. 3, a rear elevation, illustrating the ground and driving wheel as if passing over an elevation of the ground, a stone, or other obstruction upon it, which raises said wheel's lower periphery above the the line of the cutters; Fig. 4, a similar elevation, but with the ground and driving wheel as it passing through a depression of the ground, which brings its lower periphery below the line of the cutters; Fig. 5, a perspective view of the machine in operation, and illustrated with the attendant behind raising the outer end of the cutting apparatus over a stone, S, or other obstruction. Fig. 6 shows the machine from the side opposite the wheel; Fig. 7, a sectional longitudinal section, illustrating the method of raising and lowering the points of the cutters from an axis of motion which is at or near their rear ends, and of about the same height therewith, with the points of the cutters elevated; and Fig. 8, a similar section, further illustrating the same operation, but showing the points of the cutters depressed.

To enable those skilled in the art to make and use the aforesaid improvement, we will proceed to describe it, reference being had to the drawings by letters.

A A represent the side pieces of the upper or main frame of the machine, with their rear ends turned downward for forming legs, to which the lower or supplementary frame is connected; *a*, a tie by which the horizontal ends of A A are connected; $a^2$, a tie by which their front ends are connected; *b b*, the thills by which the machine is drawn, with their rear ends inserted through the tie $a^2$, for making them rigid with said upper or main frame; *n*, a slot or mortise cut down and backward in the upper edge of each of the side pieces A A, in which is placed the shaft F of the revolving reel or rake; S, a pin which holds the outer end of said shaft in the rear ends of its slot; *o*, a circular slot in the outer leg A; and *o'*, the same in the inner leg, and of the proper length and curvature for permitting the cutters and the ground and driving wheel G to vibrate from and around the shaft F as their center of motion when passing over undulating surfaces, and the drum or other gearing wheels *h* and *g* to be kept the same distance apart while so doing; G, the ground and driving wheel, which has teeth or spikes all around its rim, for preventing its slipping; I, its axle, with said wheel fast on and near its inner end, the outer end of which rests in the bottom of slot *o*, and is therein held by the pin *m*; *h*, the drum or other gearing-wheel on the inner end of axle I; F, the revolving reel or rake shaft; *g*, a small drum or other gearing wheel on its inner end; *f*, the band or other gearing which transmits the rotary motion of G through I, *h*, and *g* to F; E, the spokes of said revolving reel; E', its arms or fans; *i*, the teeth or pins in their outer edges.

B B represent the side pieces of the lower or supplementary frame; *d d*, the hinge-pins by which they are connected to the legs of the upper or main frame, and from which they extend forward horizontally with the cutters to their points, where they turn up at about right angles for having the side pieces A A, each pass through one of the vertical slots *e e* in their upper ends, which are of the proper length for permitting the points of the cutters to vibrate up and down or be raised and lowered from said hinge-pins, as occasion requires. The rear ends of the lower or supplementary frame are extended upward and backward to within reach of the attendant's hands *c*, forming a connection from one to the other for a handle-piece, by the use of which he can (and while the machine is under way or in motion) raise and lower and hold the points of the cutters at various heights.

$C^2$ represents the bar to which the rear ends of the knives or cutters D D D D D D are secured. The ends of this bar (with its rear edge at or near the hinge-pins *d d*) are made fast in the side pieces B B, and form part of said frame. The knives or cutters have their rear ends placed edge to edge on said bar $C^2$, with the outside edges of the end ones (which are only halves) let into a groove in the pieces B B parallel with their upper edges. These knives or cutters are made concave on their upper sides for strength, giving their edges an upward sloping cut and protecting them against stones, &c. To the lower side, at the center of each of said knives or cutters, is attached a rib, whose rear end abuts against said bar $C^2$ and forms a guide or runner for giving the cutters strength and keeping them from resting on the ground. The edges of these cutters are rounded off to near a point from a short distance in front of the bar $C^2$, and ground off on the bottom to a keen edge at their upper sides.

The bar C is confined to the bar $C^2$ by screw-bolts, one passing through each cutter, by which means of securing them they are held in a very secure manner and readily removed for sharpening.

The revolving reel or rake forms an indispensable part of the cutting apparatus, as it forces back and holds against the slant edges of the advancing cutters that part of the grass, &c., above them which, but for being so held, would be pushed forward by said edges (whenever not very sharp) and run over instead of being severed by them close to the ground, as it is when said reel or rake is used, by its teeth or pins passing down into the fallen grass, &c., and raising and forcing it against and over the advancing cutters, which are thereby caused to sever it close to the ground.

The advantages gained by the aforesaid invention will be readily understood by mowing-machine builders and users, and further explanations are regarded as unnecessary.

What we claim as new, and desire to secure by Letters Patent as the invention of the aforesaid DANIEL K. HARRIS and JOHN K. HARRIS, is—

1. The combination of the bar which carries the cutting-blades, the driving-wheel, and the shaft on the draft-frame, which is rotated by said wheel through a band or other gearing, and around which, as a common center, said bar and wheel will vibrate in respect to each other when drawn over undulating surfaces, substantially as described.

2. The combination of a handle-piece with the bar which carries the cutting-blades, vibrating upon an axis of motion at or near its rear edge, by which the attendant of the machine may elevate or depress the points of said blades while they are moving forward and cutting the grass, substantially as described.

In witness whereof we have hereunto subscribed our names in presence of Geo. W. Burnes and Daniel B. Neal, as witnesses thereto.

WM. N. WHITELEY.
JEROME FASSLER.
OLIVER S. KELLEY.

Witnesses:
GEO. W. BURNES,
DANIEL B. NEAL.